(12) United States Patent
Zelevinsky et al.

(10) Patent No.: US 8,868,596 B2
(45) Date of Patent: Oct. 21, 2014

(54) SET BASED ITEM RECOMMENDATION SYSTEM

(75) Inventors: Vladimir Zelevinsky, Sharon, MA (US); Jonathan Grimm, Niantic, CT (US)

(73) Assignee: Oracle International Corporation, Redwood Shores, CA (US)

( * ) Notice: Subject to any disclaimer, the term of this patent is extended or adjusted under 35 U.S.C. 154(b) by 308 days.

(21) Appl. No.: 13/451,827

(22) Filed: Apr. 20, 2012

(65) Prior Publication Data
US 2013/0191377 A1    Jul. 25, 2013

Related U.S. Application Data

(60) Provisional application No. 61/588,401, filed on Jan. 19, 2012.

(51) Int. Cl.
*G06F 17/30* (2006.01)
(52) U.S. Cl.
USPC ............................ 707/769; 707/722; 707/748
(58) Field of Classification Search
CPC .................. G06F 17/30634; G06F 17/30637; G06F 17/30657; G06F 17/30752; G06F 17/30861; G06F 17/30929
USPC ................................... 707/722, 728, 748, 769
See application file for complete search history.

(56) References Cited

U.S. PATENT DOCUMENTS

| | | | |
|---|---|---|---|
| 6,266,649 B1 * | 7/2001 | Linden et al. | 705/7.29 |
| 7,113,917 B2 * | 9/2006 | Jacobi et al. | 705/14.53 |
| 8,095,521 B2 | 1/2012 | Chan et al. | |
| 8,117,216 B1 | 2/2012 | Chanda et al. | |
| 8,370,203 B2 * | 2/2013 | Dicker et al. | 705/14.53 |
| 8,407,105 B2 * | 3/2013 | Linden et al. | 705/26.7 |
| 8,438,052 B1 * | 5/2013 | Chanda et al. | 705/7.11 |
| 2011/0276581 A1 | 11/2011 | Zelevinsky | |
| 2012/0036037 A1 | 2/2012 | Xiao et al. | |

* cited by examiner

*Primary Examiner* — Cheryl Lewis
(74) *Attorney, Agent, or Firm* — Miles & Stockbridge P.C.

(57) ABSTRACT

A system for generating one or more recommended items for a user receives a target items set for the user which includes two or more target items. The system then queries a database of a plurality of related items sets using the target items set, where each related items set comprises a plurality of related items. In response to the querying, the system retrieves one or more similar items sets from the plurality of related item sets, each similar items set being similar to the target items set. The system then performs a union of the similar items sets to generate the recommended items.

20 Claims, 4 Drawing Sheets

SET BASED ITEM RECOMMENDATION SYSTEM

CROSS REFERENCE TO RELATED APPLICATIONS

This application claims priority of Provisional Application Ser. No. 61/588,401, filed on Jan. 19, 2012, the contents of which is hereby incorporated by reference.

FIELD

One embodiment is directed generally to a computer system, and in particular to a computer system that provides recommendations of items.

BACKGROUND INFORMATION

Web sites and other types of interactive systems may implement recommendation services or a recommendation engine for recommending items stored or represented in a data repository. These services can operate, for example, by receiving as input a target item, and by outputting a ranked list of items that are collectively similar or related to the target item.

One common application for recommendation services involves recommending products for purchase, rental, subscription, viewing or some other form of consumption. For example, e-commerce web sites commonly provide services for recommending products to users based on their respective purchase histories, rental histories, product viewing histories, and/or item ratings. Recommendation services are also commonly used to recommend web sites, articles, users, music and video files, and other types of items.

SUMMARY

One embodiment is a system for generating one or more recommended items for a user. The system receives a target items set for the user which includes two or more target items. The system then queries a database of a plurality of related items sets using the target items set, where each related items set comprises a plurality of related items. In response to the querying, the system retrieves one or more similar items sets from the plurality of related item sets, each similar items set being similar to the target items set. The system then performs a union of the similar items sets to generate the recommended items.

DETAILED DESCRIPTION

One embodiment is an item recommendation system that receives a target set of items and matches it with one or more retrieved sets of items that have items in common with the target set. The system then generates recommended items from all of the items included in the retrieved sets.

Figure 1:
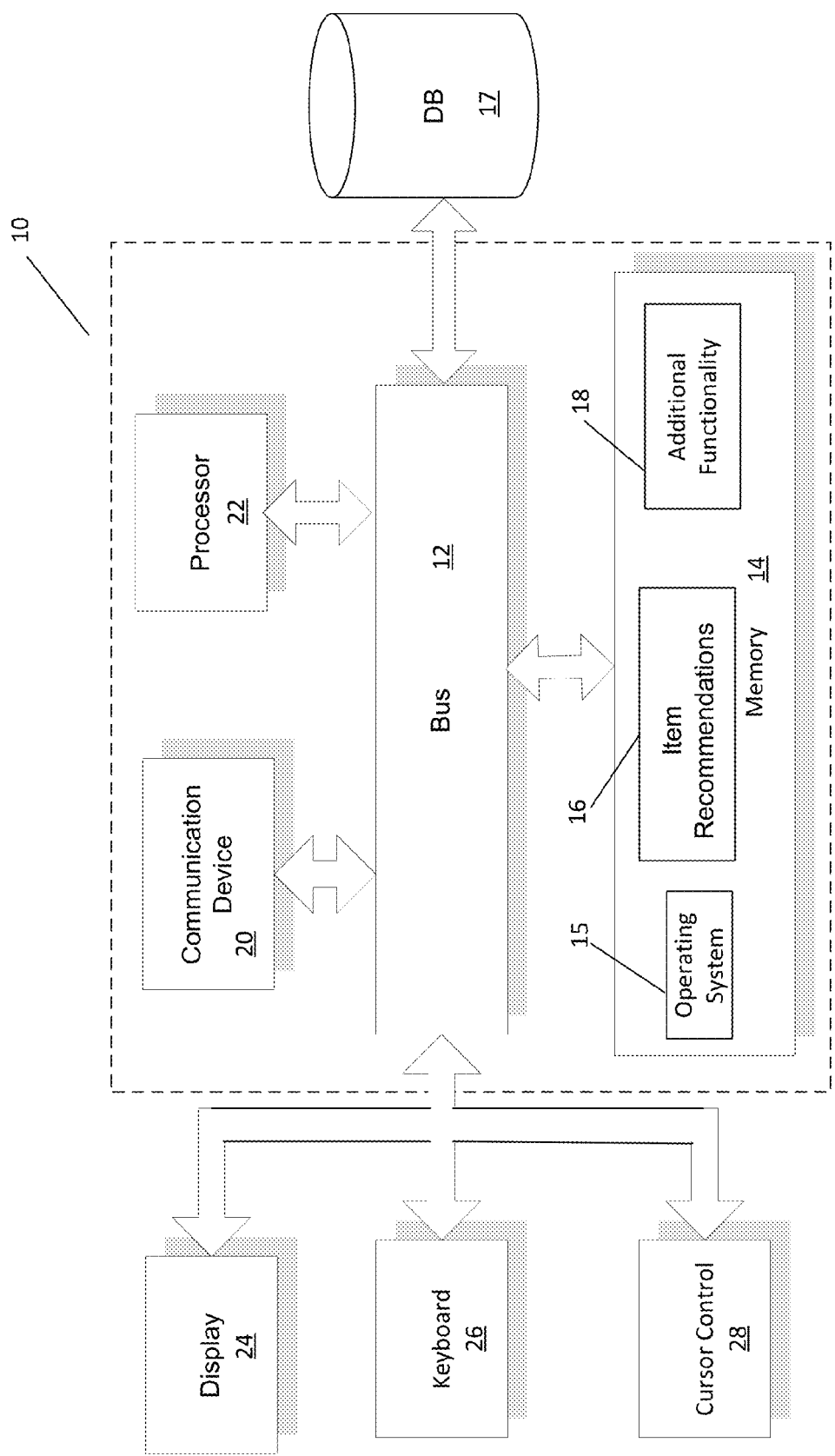
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include item recommendations module 16 that generates item recommendations based on an item set-to-set query, as disclosed in more detail below. System 10 can be part of a larger system, such as a web based e-commerce retail system or an enterprise resource planning ("ERP") system. Therefore, system 10 will typically include one or more additional functional modules 18 to include the additional functionality. A database 17 is coupled to bus 12 to provide centralized storage for modules 16 and 18 and store item sets, pricing information, inventory information, ERP data, etc.

Figure 2:
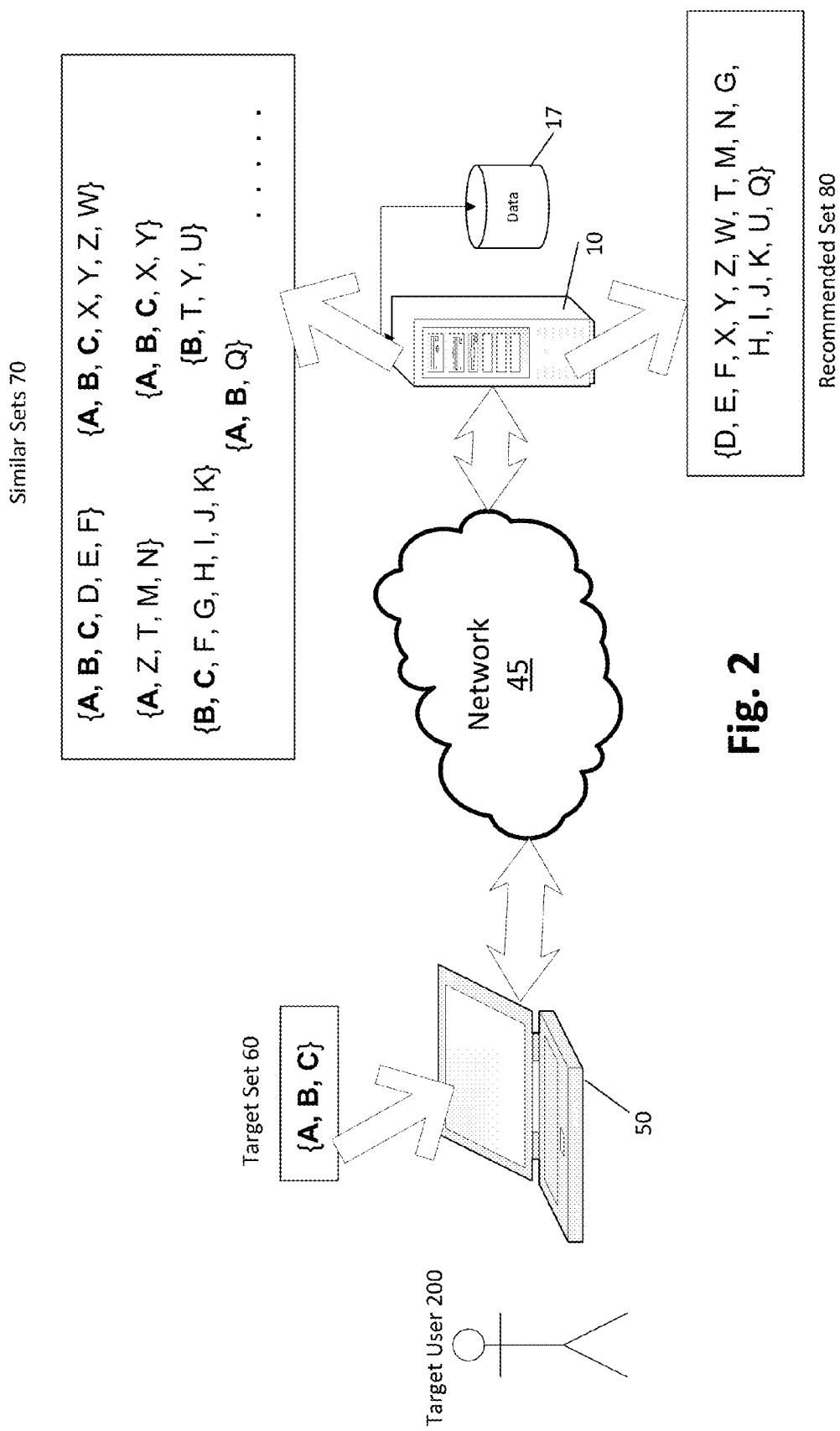
FIG. 2 is an overview block diagram of an example of an item recommendation system in accordance with embodiments of the present invention.

FIG. 2 is an overview block diagram of an example of an item recommendation system in accordance with embodiments of the present invention. In FIG. 2, a target user/customer 200 interfaces with server 10 via a computer 50 and a network 45. Network 45 can by any type of communication network, such as the Internet or an Intranet or other private network. Computer 50 can be any type of device that allows user 200 to interface with server 10, including a laptop computer, smart phone, tablet, etc., using a wired or wireless connection, or any other method. Further, in other embodiments, user 200 can interface directly with server 10 (i.e., not via a network) as discussed in conjunction with FIG. 1.

In one embodiment, user 200, using an Internet browser on computer 50, interfaces with an e-commerce web page/site hosted by server 10, or some other web server coupled to server 10. The e-commerce web page allows user 200 to browse, purchase, view, recommend, etc., various items displayed on the web page.

Embodiments of the present invention provide recommendations of additional items to user 200 in response to an identity of two or more input items that user 200 has selected in any manner (referred to as a "target set" of items). The target set of items may be previously purchased items, items currently in a shopping cart, items browsed at during the current or past sessions, wish-listed items, items explicitly promoted by a current campaign, rated items, based on navigation actions performed while viewing items, etc.

Known recommendation systems provide recommendations in response to an input/target item in multiple ways. In some known systems, a single input item results in a set of recommended items (e.g., "If you bought this cookbook, here are other cookbooks you should consider"). These systems tend to be fast-working, creating recommendations based on an item-to-item similarity metric between an item the customer currently is considering or buying and an item historically favored by a comparable customer. Therefore, the suggested items are similar to the items already purchased (or wish-listed, viewed, etc.).

Other known systems use complex data-mining engines that can produce more sophisticated recommendations, but tend to involve complex, time-consuming processes, and return results that are (a) opaque in their reasoning; and (b) not based on the up-to-date data. For example, many of these systems are batch type systems that return results days or weeks after the input (i.e., not in "real-time").

Further, other known systems use hard-coded rules such as "If the customer is buying a Samsung 60 inch HDTV and a Sony Blu-Ray player, recommend Monster Cables UG-389 and SK-53L to connect them, and push our on-site installation service." However, such systems require constant human input to create and maintain recommendation rules.

Referring again to the example of FIG. 2, target set 60 includes three items designated by letters {A, B, C}. In other embodiments, target set 60 can include as few as two items, and up to an unlimited number of items. Target set 60, received by system 10, is used to query database 17. Database 17 stores a database of related items sets (i.e., sets of two or more related items) based on previous user interactions, including users different from user 200. The related items sets could be "bought together", "bought by the same customer", "wish-listed together", "browsed in one session", "promoted by the same ad campaign", etc. Any type of relationship can be used to relate items together in a set. The system can contain sets with different relationships, or, inside each particular set the relationships can be different. Further, as disclosed above, the items do not have to represent physical items. Instead, the items can be documents, particular user actions (e.g., a specific interaction with the web site, such as a request to change address, open a new account), etc.

System 10 receives target set 60 and queries database 17 to retrieve similar items sets 70. The nature of the similarity could be any known types of similarity such as: sufficient set member overlap; overlap in product categories/tags; using known methods for determining similarity in n-dimensional attribute space for determining a small enough angle in the vector space of products or a small enough angle in the vector space of product tags; similarity of customer demographics, etc. The similarity could combine several different similarity criteria, via weighting, logical AND ("must satisfy all of these similarity requirements"), logical OR ("must satisfy any of these similarity requirements"), etc.

In the example of FIG. 2, the similarity is whether there is an overlap of at least one item of target set 60. Therefore, similar sets 70 include the following sets of items: {A, B, C, D, E, F}, {A, Z, T, M, N}, {B, C, F, G, H, I, J, K}, {A, B, C, X, Y, Z, W}, {A, B, C, X, Y}, {B, T, Y, U}, {A, B, Q}. As shown, each of the similar sets 70 has at least one item (indicated by a bolded letter) in common with target set 60. Further, all items within each of similar sets 70 are related to each other in some manner. Although only seven similar sets 70 are shown in the example of FIG. 2, an unlimited number of similar sets may be generated in response to the query of the related items sets stored in database 17.

For each retrieved similar set 70, system 10 may optionally compute the similarity between the similar set and target set 60. This similarity computation may take place after similar sets 70 are retrieved so that nature of the similarity computation can differ from the nature of similarity that the retrieval was based on. For example, similar sets 70 may be retrieved based on the criteria of "Does this set share at least two items with the target set?", while the computation of similarity can employ Kullback-Leibler "K-L" divergence, or any other known similarity algorithm. In another embodiment, the query and similarity computation take place at the same time: the system retrieves similar items at the same time it computes their similarity to target set 60. Further, in other embodiments, recommendations are generated without performing any similarity computation. In such embodiments, the retrieved similar sets 70 are considered to be all equivalently similar to the target set.

Using the set of similar sets 70 that are similar to target set 60, along with the optional measure of similarity for each similar set, system 10 then collates similar sets 70 to obtain a recommended items set 80 of recommended items. If the embodiment did not measure similarity after or during the retrieval of similar sets 70, the recommendations can be collated into an unranked set, such as recommendations 80, which is the union of all items of all sets other than the target set items (i.e., {D, E, F, X, Y, Z, W, T, M, N, G, H, I, J, K, U, Q}). The item relevance can also be derived from the number of similar sets in which the item is present, or each item can be weighted depending on how many common items from target set 60 are in each set. Therefore, items from similar set {A, B, C, D, E, F} will be given a greater weight than items from similar set {A, Z, T, M, N} because the first set includes three items from target set 60, while the second set only includes one item. In embodiments for which the similarity was computed, the item relevance can be derived from these similarity measurements by, for example, adding the similarity measurements for each set in which the item is present. In one embodiment, the list of recommended items is ranked based on the similarity computations.

In one embodiment, if the list of recommended items is ranked, the list can be trimmed, based on the item relevance scores. The ranking could take the top "N" items, or the items with the score higher than average, or the items with the scores higher than the median score multiplied by a certain parameter, or the items above the biggest drop-off in the relevance scores, etc.

One embodiment allows refining of the recommended items, based on the properties of the items (e.g., price, tags, etc.). One embodiment allows refining the recommended items, based on the properties of the similar sets (e.g., "Make recommendations based on the prior purchases of customers like me"). The refining can reduce the number of recommended items, sort the recommended items, etc.

Figure 3:
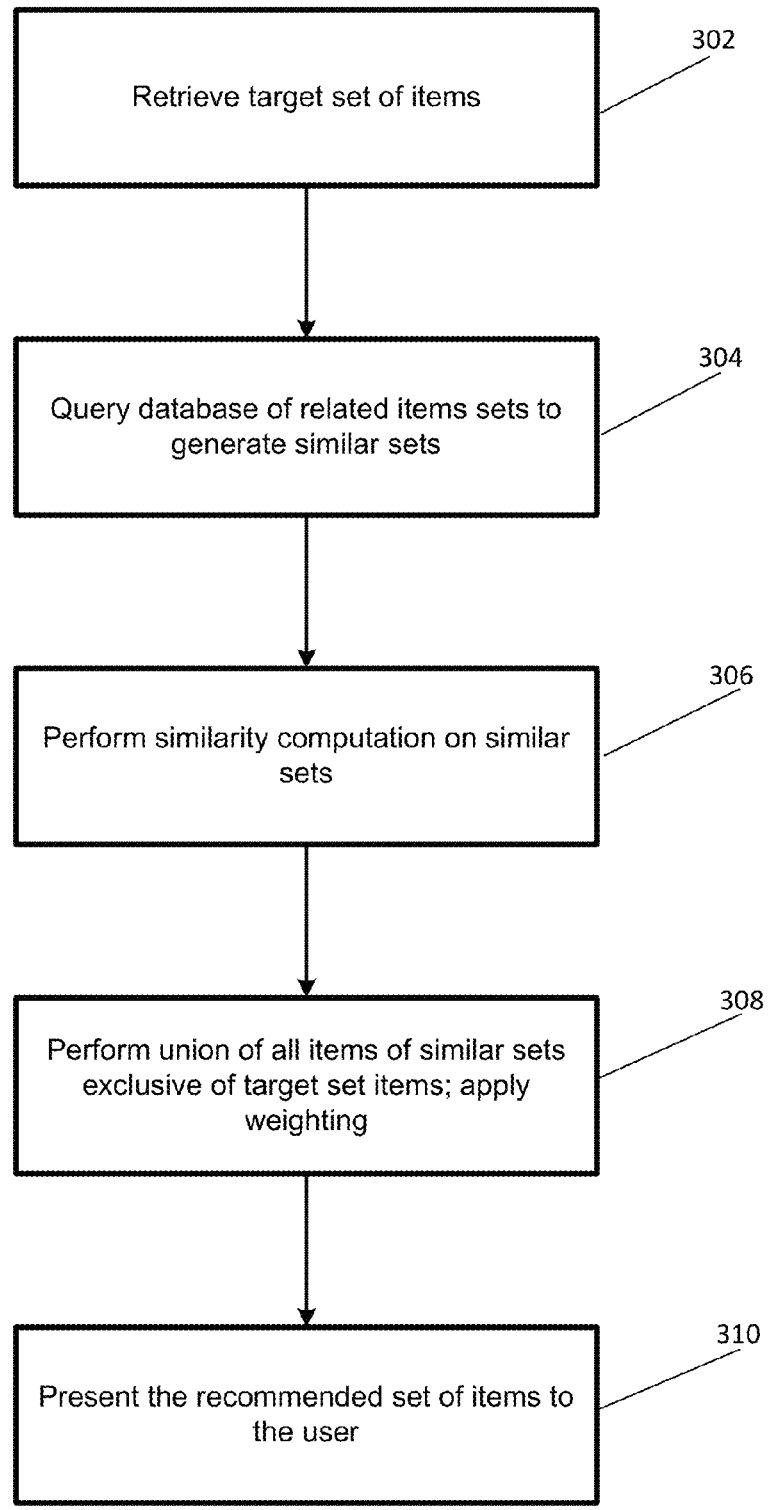
FIG. 3 is a flow diagram of the functionality of the item recommendations module of FIG. 1 when generating a set of recommended items from a target set of items in accordance with one embodiment.

FIG. 3 is a flow diagram of the functionality of item recommendations module 16 of FIG. 1 when generating a set of recommended items from a target set of items in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, target set 60 is retrieved. Target set 60 is generated in response to user 200 activities, such as purchasing items, browsing items, reviewing items, etc. Target set 60 includes two or more target items that system 10 is targeting recommendations for.

At 304, database 17 of previous coherent/related items sets (e.g., other customers' shopping baskets) is queried so that a proximity between target set 60 and database 17 is measured. The proximity metric can be overlap, symmetric overlap, vector distance (either Cartesian vector product, or a more complex metric that weighs dimensions differently), relative entropy, etc. The result is similarity sets 70.

At 306, a similarity computation on the similarity sets can be performed to limit the sets to those with the highest proximity to the target sets.

At 308, a union of all items of similarity sets 70 is performed, weighted with the factor related to the proximity. In the simplest case, the factor is equal to the proximity. Items already in the target set are removed from the resulting union, so the same target items are not recommended. The result is a recommended set 80 of items.

At 310, the recommended set is returned to the user. In one embodiment, the set of recommended items is sorted in the order of the resulting weights. In one embodiment, the set of items is presented to the user in the form of a personalized shopping web site, as disclosed below.

Embodiments generate recommended items to the user in "real-time" as the user is interacting, for example, with an e-commerce web site. No lengthy processing is necessary which may result in outdated results. Further, embodiments are not limited to an item (or items) based on a (previously purchased) single item—but a set of items based on a set of items. Further, embodiments provide recommendations based on a target set that does not have to be a shopping basket. The target set could be past shopping history, the list of items in a wish list, items looked at during the present session, etc. The target set can even be based on all of these different source target items and then collated (possibly with different weights). The same flexibility also applies to the sets of historical data from which the recommendations are derived. Still further, embodiments generate recommended items in any quantity, as many as necessary. Therefore, an entirely personalized shopping web site can be generated based on the unlimited recommended items.

In one embodiment, the recommended items are presented to the user as faceted data. This embodiment can provide the following additional functionality:

Power guided navigation: the user can navigate on the properties of the items. For example, instead of a "people like you also bought X" type of recommendation, embodiments can includes a separate "just for you" store with navigation, search, refinements, etc.

The recommendations can be navigated on the properties of the sets the recommendations were derived from (for example, only compare the target set to the sets with a particular total dollar amount, or date, or state shipped to, etc.).

The recommendations can be navigated on the properties of other customers whose past shopping behavior is used to generate these recommendations (for example, gender, age, average purchase amount, purchase frequency, etc.).

The recommendations can be time-weighted. If the database sets are time-stamped, a time decay element can be added when collating the compared sets. If a similar set is old, it can be collated with a lower weight (by introducing, for example, an exponential time decay series). This can be used to emphasize new or trendy offerings.

All of the above features can be combined to generate a user based querying of recommended items such as "Find me clothing items under $10 purchased in summer by female customers in Florida." Further, the recommendations can be used by merchandisers as marketing/positioning recommendations. For example, system 10 can generate a draft set of recommendations to power a rules-based merchandizing approach.

In one embodiment, since the recommendations are computed rapidly, a feedback loop is included, with guided navigation providing a narrowing of the result set, and then a re-querying of database 17 based on the additional criteria provided by the user's actions, offering a personalized addition of new results.

As disclosed, items in the target and related sets do not have to represent physical items. For example, the items can include the ways the user interacted with the site (e.g., a user who (a) changed their address and (b) looked at a 401(k) form, should be recommended (c) opening a retirement account). Likewise, the sequence of guided navigation refinements (e.g., text search for "nuclear"; geospatial navigation to Middle East; language selection to "Arabic") can also be the basis for the query of database 17.

Because embodiments of the present invention use set-to-set functionality, recommendation results will differ compared to, for example, known single item-to-set functionality. For example, when a customer buys a pair of black pants, the known single item systems will likely recommend a matching black belt. A similar purchase of brown pants will result in a recommendation of a brown belt. In this example, embodiments of the present invention will make the same recommendations, since the "set" in these examples contains just one item.

However, when both black and brown pants are purchased together, the known single item systems will generate recommendations for each item and, as a result, will recommend a black belt and a brown belt. In contrast, embodiments of the present invention will locate the items that tend to complement the "black pants, brown pants" set and, as a result, may recommend a two-sided black/brown reversible belt—in addition to recommending regular black and brown belts. In another example, the purchase of a map of California and a cookbook will likely result, in known single item systems, in the recommendations of more maps and more cookbooks. In contrast, embodiments of the present invention may also recommend, for example, travel guides to the restaurants of Napa Valley.

Figure 4:
FIG. 4 is a screen shot of a web site displaying all or many recommended items for a user in accordance with an embodiment of the present invention in the form of a personal user store.

FIG. 4 is a screen shot of a web site displaying all or many recommended items for a user in accordance with an embodiment of the present invention in the form of a personal user store. As disclosed, embodiments can generate an unlimited number of recommended items for a user based on a set of target items. As a result, a "personalized" web site featuring only recommended items for that user can be generated. In the example of FIG. 4, a personalized web site for recommended cameras is generated. However, in other examples, the web site can include all types of recommended items and provide faceted navigation to the user.

In another embodiment, the generated recommendation sets are in the form of vectors incorporating user characteristics and actions and items together. This embodiment balances behavioral similarity and product association (e.g., "I put the same five items into my basket as other people did, but they actually bought them and I just looked at them before buying something else."). Such selectivity could be facilitated by grouping subsets within the sets into associations, much as the data set underlying guided navigation is grouped as values associated with an attribute. This permits different weights to be applied to item matches across associations and item matches within an association.

As disclosed, embodiments use a target set of two or more items to query a database of sets of related items to generate similar sets to the target sets. The union of the similar sets results in a set of recommended items. The recommended items may be weighted or otherwise ranked and then presented to the user.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable storage medium having instructions stored thereon that, when executed by a processor, causes the processor to generate one or more recommended items for a user, the generating comprising:
   receiving a target items set for the user, wherein the target items set comprises two or more target items;
   querying a database of a plurality of related items sets using the target items set, wherein each related items set comprises a plurality of related items, wherein the querying comprises determining a similarity between the target items set and the plurality of related items sets;
   in response to the querying and the similarity determination, retrieving one or more similar items sets from the plurality of related item sets, wherein each similar items set is retrieved when the similar items set has one or more items in common with the target items set; and
   performing a union of the similar items sets to generate the recommended items.

2. The non-transitory computer readable storage medium of claim 1, wherein the recommended items comprise all items from the union minus the target items.

3. The non-transitory computer readable storage medium of claim 1, the generating further comprising: determining a level of similarity between each similar items set and the target set.

4. The non-transitory computer readable storage medium of claim 1, the generating further comprising: presenting the recommended items to the user.

5. The non-transitory computer readable storage medium of claim 4, wherein the recommended items are presented to the user as a ranked list.

6. The non-transitory computer readable storage medium of claim 4, wherein the recommended items are presented to the user as a personalized web site.

7. The non-transitory computer readable storage medium of claim 4, wherein the recommended items are presented to the user as faceted data.

8. The non-transitory computer readable storage medium of claim 1, the generating further comprising performing a similarity computation between the target items set and each retrieved similar items set.

9. The non-transitory computer readable storage medium of claim 1, wherein each similar items set is weighted based on an amount of items in the similar items set in common with the target items set.

10. A computer-implemented method for generating one or more recommended items for a user, at least a portion of the method being performed by a computing device comprising at least one processor, the method comprising:
    receiving a target items set for the user, wherein the target items set comprises two or more target items;
    querying a database of a plurality of related items sets using the target items set, wherein each related items set comprises a plurality of related items, wherein the querying comprises determining a similarity between the target items set and the plurality of related items sets;
    in response to the querying and the similarity determination, retrieving one or more similar items sets from the plurality of related item sets, wherein each similar items set is retrieved when the similar items set has one or more items in common with the target items set;
    performing a union of the similar items sets to generate the recommended items; and presenting the recommended items to the user.

11. The method of claim 10, wherein the recommended items comprise all items from the union minus the target items.

12. The method of claim 10, further comprising:
    determining a level of similarity between each similar items set and the target set.

13. The method of claim 10, further comprising performing a similarity computation between the target items set and each retrieved similar items set.

14. The method of claim 10, wherein each similar items set is weighted based on an amount of items in the similar items set in common with the target items set.

15. The method of claim 10, wherein the receiving the target items set for the user is in response to the user interacting with one or more e-commerce web pages.

16. The method of claim 10, further comprising presenting the recommended items to the user as faceted data.

17. A system for generating one or more recommended items for a user, the system comprising:
    a processor;
    a memory coupled to the processor;
    a database coupled to the processor, the database storing a plurality of related items sets, wherein each related items set comprises a plurality of related items;
    the processor adapted to receive a target items set for the user, wherein the target items set comprises two or more target items, and query the database using the target items set, wherein the query comprises determining a similarity between the target items set and the plurality of related items sets;
    in response to the querying and the similarity determination, the processor adapted to retrieve one or more similar items sets from the plurality of related item sets, wherein each similar items set is retrieved when the similar items set has one or more items in common with the target items set; and
    the processor adapted to perform a union of the similar items sets to generate the recommended items.

18. The system of claim 17, wherein the recommended items comprise all items from the union minus the target items.

19. The system of claim 17, the generating further comprising performing a similarity computation between the target items set and each retrieved similar items set.

20. The system of claim 17, wherein each similar items set is weighted based on an amount of items in the similar items set in common with the target items set.

* * * * *

UNITED STATES PATENT AND TRADEMARK OFFICE
CERTIFICATE OF CORRECTION

| | | |
|---|---|---|
| PATENT NO. | : 8,868,596 B2 | Page 1 of 1 |
| APPLICATION NO. | : 13/451827 | |
| DATED | : October 21, 2014 | |
| INVENTOR(S) | : Zelevinsky et al. | |

It is certified that error appears in the above-identified patent and that said Letters Patent is hereby corrected as shown below:

In The Specification

In column 2, line 54, delete "can by" and insert -- can be --, therefor.

Signed and Sealed this
Twenty-third Day of June, 2015

Michelle K. Lee
*Director of the United States Patent and Trademark Office*